(12) United States Patent  (10) Patent No.: US 7,874,343 B2
Hansen  (45) Date of Patent:  Jan. 25, 2011

(54) ROLLER BLIND WITH NOISELESS FLAT SPIRAL SPRING DRIVE

(75) Inventor: Melf Hansen, Gondelsheim (DE)

(73) Assignee: BOS GmbH & Co. KG, Ostfildern (DE)

( * ) Notice: Subject to any disclaimer, the term of this patent is extended or adjusted under 35 U.S.C. 154(b) by 521 days.

(21) Appl. No.: 11/800,564

(22) Filed: May 7, 2007

(65) Prior Publication Data

US 2007/0272375 A1  Nov. 29, 2007

(30) Foreign Application Priority Data

May 23, 2006  (DE) .................... 10 2006 024 538

(51) Int. Cl.
 B60J 1/18  (2006.01)
 E06B 9/56  (2006.01)
 A47G 5/02  (2006.01)
(52) U.S. Cl. .................. 160/370.22; 160/299; 160/314
(58) Field of Classification Search ............ 160/370.22, 160/265, 313, 314, 299, 296, 297, 298; 185/38, 185/37, DIG. 1; 242/385, 385.1, 385.4, 379, 242/379.1, 379.2, 378, 378.1, 378.2, 375, 242/375.1, 375.2; 267/136, 158, 160, 161, 267/54–156, 272, 273; 248/252, 258, 264, 248/266, 267, 268, 624, 625, 636
See application file for complete search history.

(56) References Cited

U.S. PATENT DOCUMENTS

| | | | | | |
|---|---|---|---|---|---|
| 1,132,958 | A | * | 3/1915 | Miller | 192/70.12 |
| 1,228,303 | A | * | 5/1917 | Drumm | 160/314 |
| 2,034,258 | A | * | 3/1936 | Hausser | 411/162 |
| 2,069,402 | A | * | 2/1937 | Cowlin | 411/154 |
| 2,179,575 | A | * | 11/1939 | Hosking | 411/162 |
| 2,355,568 | A | * | 8/1944 | Smith | 428/47 |
| 2,463,303 | A | * | 3/1949 | Petrie | 242/381.6 |
| 3,481,381 | A | * | 12/1969 | Black | 411/162 |

(Continued)

FOREIGN PATENT DOCUMENTS

AT  297606  4/1972

(Continued)

OTHER PUBLICATIONS

Office Action issued May 7, 2009 in German counterpart application, 102006024538.5.

(Continued)

*Primary Examiner*—Katherine Mitchell
*Assistant Examiner*—Jaime F Cardenas-Garcia
(74) *Attorney, Agent, or Firm*—Leydig, Voit & Mayer, Ltd.

(57) ABSTRACT

A spring motor having a pot shaped housing in which a flat spiral spring is housed. The flat spiral spring is connected at one outer end to the pot-shaped housing while the inner end is coupled to a shaft or axle. To prevent radial vibrations of individual spring layers when the spring motor is wound or unwound, a damping plate is housed in the pot-shaped housing and held in pressed engagement with a side edge of the flat spiral spring. This spring motor can be combined with the wind-up shaft of roller-blind arrangements for motor vehicles, including fixed roller blinds, storage-area covers, or separating screens.

43 Claims, 6 Drawing Sheets

U.S. PATENT DOCUMENTS

| | | | | |
|---|---|---|---|---|
| 4,139,231 | A * | 2/1979 | Lang et al. | 296/37.16 |
| 4,222,601 | A * | 9/1980 | White et al. | 296/37.16 |
| 4,618,047 | A * | 10/1986 | Kinz | 192/89.23 |
| 4,668,001 | A * | 5/1987 | Okumura et al. | 296/37.16 |
| 4,671,557 | A * | 6/1987 | Lemp | 296/37.16 |
| 4,711,434 | A * | 12/1987 | Haag | 267/161 |
| 5,002,165 | A * | 3/1991 | Organ | 188/282.1 |
| 5,072,917 | A * | 12/1991 | Pleva | 267/162 |
| 5,253,852 | A * | 10/1993 | Pleva | 267/162 |
| 5,464,052 | A * | 11/1995 | Wieczorek et al. | 160/23.1 |
| 5,629,503 | A * | 5/1997 | Thomasen | 181/199 |
| 5,691,037 | A * | 11/1997 | McCutcheon et al. | 428/172 |
| 6,279,679 | B1 * | 8/2001 | Thomasen | 181/208 |
| 6,349,986 | B1 * | 2/2002 | Seel et al. | 296/37.16 |
| 6,598,651 | B2 * | 7/2003 | Ehrenberger et al. | 160/238 |
| 6,715,525 | B2 * | 4/2004 | Ehrenberger et al. | 160/23.1 |
| 6,763,915 | B2 * | 7/2004 | Nagao et al. | 185/37 |
| 7,360,822 | B2 * | 4/2008 | Carroll et al. | 296/187.03 |
| 7,445,685 | B2 * | 11/2008 | Deakin et al. | 156/212 |
| 2001/0050194 | A1 * | 12/2001 | Ishihara et al. | 181/167 |
| 2003/0066713 | A1 * | 4/2003 | Nagao et al. | 185/37 |
| 2005/0257903 | A1 * | 11/2005 | Schimko et al. | 160/370.22 |
| 2009/0188746 | A1 * | 7/2009 | Yamada et al. | 181/207 |

FOREIGN PATENT DOCUMENTS

| | | |
|---|---|---|
| DE | 19640846 A1 | 4/1998 |
| DE | 69416376 A2 | 6/1999 |
| DE | 102004024682 A1 | 12/2005 |
| EP | 0 652 136 A2 | 5/1995 |
| EP | 1 598 517 A1 | 11/2005 |
| JP | 01-01303333 A | 7/1989 |
| JP | 07224137 A * | 8/1995 |

OTHER PUBLICATIONS

Office Action issued Jan. 20, 2010 in German counterpart application 102006024538.5-56.

* cited by examiner

ROLLER BLIND WITH NOISELESS FLAT SPIRAL SPRING DRIVE

FIELD OF THE INVENTION

The present invention relates generally to window roller blinds for motor vehicles, and more particularly, to motor vehicle window roller blinds that are automatically extendable and retractable.

BACKGROUND OF THE INVENTION

For shading vehicle windows, it is known to use roller-blind arrangements. The roller blinds have a wind-up shaft which is mounted in the vehicle and to which the shade material is attached with one edge. With the aid of the drive device, the shade material is unwound from the wind-up shaft. Various gear devices are known for the drive.

For a different group of window roller blinds, the unwinding of the shade material is effected manually, in that a handle attached to the front edge of the shade material is grasped and guided away from the wind-up shaft. Here, the front edge of the shade material is understood to be the edge that extends the greatest distance in the pulling-out motion.

The roller blind is typically wound with the aid of a spring motor. For the spring motor, two types are also known in the art. According to one type, a helical spring is contained in a wind-up shaft having a tubular construction. The helical spring is fixed at one end to the chassis and is locked in rotation at the other end to the wind-up shaft. The spring motor is wound when the shade material is pulled out. In this way, elastic energy is stored, which is converted into movement when the shade material is rewound onto the wind-up shaft. The winding or unwinding requires about 10 revolutions of the wind-up shaft.

In addition to the use of a helical spring as the spring motor, spring motors based on flat spiral springs are also known. Flat spiral springs have the advantage that the biasing force is nearly constant over the stroke of the spring motor, i.e., corresponding to the length of extension of the shade material. Accordingly, a spring motor based on a flat spiral spring does not need to have a significantly longer stroke than what corresponds to the required number of revolutions of the wind-up shaft during extension or retraction of the shade material. It is sufficient if the flat spiral spring motor merely is designed with an overstroke corresponding to the necessary tolerance. The flat spiral spring motor, moreover, also is relatively rattle free from vehicle vibrations.

However, when unwinding or winding, the flat spiral spring motor can exhibit an unpleasant property in that the spring windings, during continuous motion of the spring motor, generate radial vibrations in the transition from one winding to the other winding which lead to rattling noises. Two windings of the flat spiral spring motor are produced from that part contacting the inside of the spring housing and from the other part that is already wound on the shaft of the spring motor as a winding.

OBJECTS AND SUMMARY OF THE INVENTION

It is an object of the invention to provide a spring motor which has a flat spiral spring as an elastic element and which does not generate rattling or buzzing noises characteristic of the prior art.

Another object is to provide a roller-blind device in which the wind-up shaft is driven by means of a spring motor with a flat spiral spring that is noiseless in operation.

In an illustrative roller-blind device for vehicles for winding the shade material, a wind-up shaft is used which is rotatably mounted in the vehicle. To set the wind-up shaft in rotation in the sense of winding the shade material, according to the invention a spring motor is provided with a flat spiral spring that is accommodated in a pot-shaped housing. So that the spring windings cannot strike each other with their flat sides during the one continuous motion of the spring motor, a damping plate is provided, which is held in contact with an edge of the flat spiral spring packet. Thus, it acts against the narrow side of the spring windings, that is, predominantly against that part of the spring windings lying in the transition area between the wound and unwound packet spring positions.

When the spring motor is running, an intermediate area is formed in which the spring windings do not lie against each other, but instead are clearly spaced apart from each other. This area moves while the spring motor runs in the radial direction through the pot-shaped housing of the spring motor. When the spring windings transition through this loose area, heretofore it could lead to radial vibrations of the spring windings, with the spring windings striking each other and generating noise. The damping plate damps the radial vibrations.

The roller-blind arrangement according to the invention can involve a window roller blind, for example, a rear-window or a side-window roller blind. Another application is the construction of the roller-blind device as a trunk cover. Yet another embodiment is the construction of the roller-blind device as a separating screen device.

The flat spiral spring can be arranged both coaxially to the wind-up shaft and also next to its edge or the winding, which is located on this shaft and which is formed by the shade material. According to drive kinematics, the spring housing can be stationary or locked in rotation with the wind-up shaft.

Simple abutment relationships for the damping plate are given when a cover, which closes the spring housing optionally with the exception of an axle or shaft bore, is provided on the housing. The damping plate can also form the cover of the housing.

For rotationally fixed anchoring of the flat spiral spring, the outer end can be bent into a loop or else it is perforated, as is known from clockwork springs. In the simplest case, the inner end is bent at a right angle in order to form a radially extending straight section.

The damping plate can be composed of an elastic, but sufficiently stiff, plastic material. The material is selected so that it produces favorable frictional engagement with the spring steel. In particular, it must be ensured that the damping plate is sufficiently resistant to wear and can generate sufficiently high restoring forces over the entire temperature range likely to occur in vehicles.

Alternatively, the surface may not be too smooth or low-friction, because otherwise the purpose of damping the radial vibrations of the spring winding during the transition between the two stacks could not be achieved. The specific material that is suitable for these purposes will be understood or can be determined experimentally by a person skilled in the art.

The damping plate can be provided with raised sections for generating the contact force on the spring windings. These raised sections may have the form of spherical caps or a groove that runs around the axis of the damping plate because the center area of the flat spiral spring is predominantly affected by the rattling or buzzing noises. On the other hand, the friction that the damping plate produces may not be so large that it blocks the effect of the spring motor. In the case of the use of spherical caps, the diameter of the cap in the area where it transitions into the plane of the damping plate is less than half the diameter.

Other objects and advantages of the invention will become apparent upon reading the following detailed description and upon reference to the drawings, in which:

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENT

Figure 1:
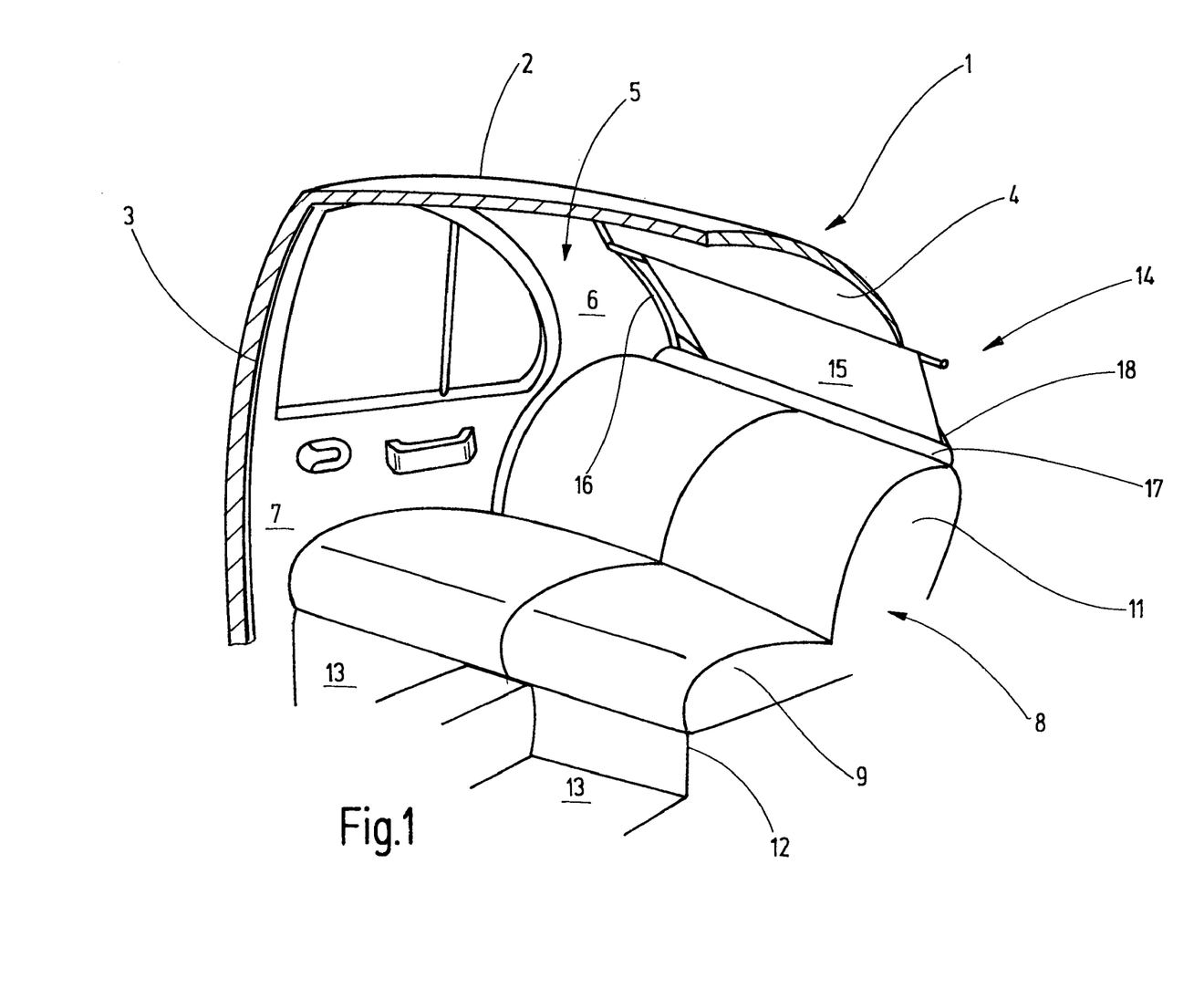
FIG. 1 is a broken open perspective of a rear area of a motor vehicle having a window roller blind in accordance with the invention.

Referring now more particularly to FIG. 1 of the drawings, there is shown an illustrative passenger vehicle body or chassis section 1 having a rear window roller blind assembly 14 in accordance with the invention. FIG. 1 represents a cut away area of a passenger car, viewed towards the right side interior which is mirror image of the left side interior. The representation is simplified, for example, internal chassis structures, such as reinforcements and attachment means are not shown because the representation is not required for an understanding of the invention.

The illustrated chassis section 1 has a roof 2 from which B-columns 3 extend downwardly on opposing sides to a floor assembly of the vehicle. The roof 2 transitions at its rear edge into a rear window 4. At the side, the rear window 4 ends at C-columns 5, which are located at a distance to the B-columns 3. The C-column 5 carries an inner lining 6. The width of the rear window 4 is smaller in the vicinity of the top edge than at the height of the midline of the chassis.

Between the B-column 3 and the C-column 5, a right rear door 7 is hinged to the B-column in a known way. At the height of the right rear door 7 there is a rear seat bank 8, which includes a seat surface 9 and a rear seat back 11. The rear seat surface 9 lies on a base surface 12 of the floor assembly and in which a foot space 13 is formed in front of the rear seat surface 9.

On the inside in front of the rear window 4 there is located the rear window roller blind 14. A partially pulled-out shade material 15 of the rear window roller blind 14 and also one of its side guide rails 16 can be seen in FIG. 1. The guide rail 16 begins at a rear seat shelf 17 behind the rear seat back 11 and runs next to the side window edge. The other guide rail, a mirror image, is located on an opposite side of the chassis. The guide rails preferably are made of plastic and are integrated into the inner lining covering the C-column 5. The rear seat shelf 17 has a continuous discharge slot 18 from which the shade material 15 emerges when it is pulled out.

Figure 2:
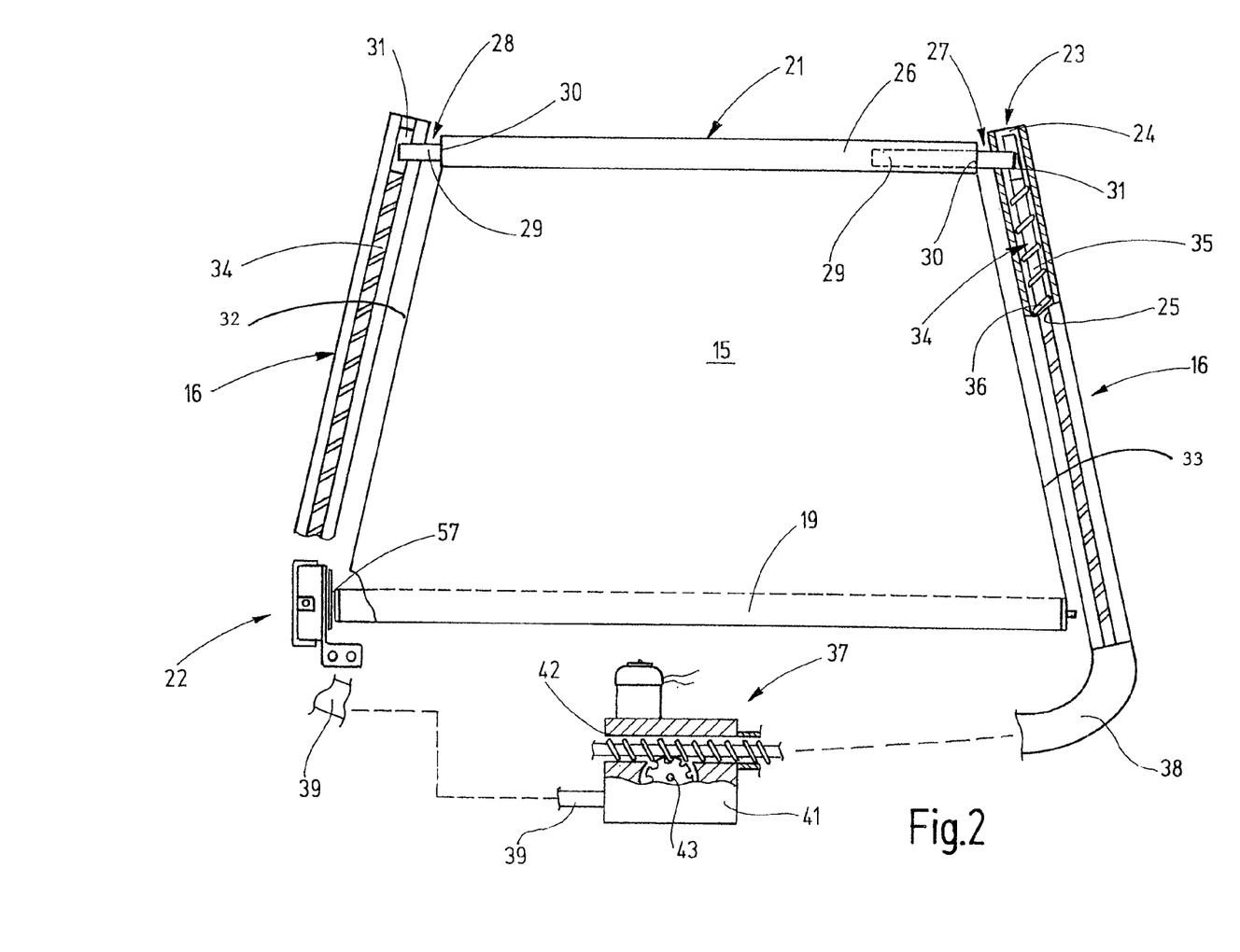
FIG. 2 is a diagrammatic depiction of the actuating mechanism for moving a pull rod or element of the illustrated roller blind to an extended position and which includes a flat spiral spring motor for returning the roller blind to a retracted position.

The basic construction of the rear window roller blind 14 is depicted in FIG. 2. The rear window roller blind 14 includes, in addition to the shade material 15, a wind-up shaft 19 and also a pull-out profile or rod 21 rotatably mounted below the pull-out slot 18 and rear seat shelf 17. The shade material 15 has a trapezoidal outline approximating the window geometry and is thus narrower at the top end than at the bottom end near the wind-up shaft 19.

The shade material 15 is attached with one edge to the wind-up shaft 19. With the aid of a spring motor arrangement 22, which is arranged outside of the wind-up shaft 19, the wind-up shaft 19 is biased in the sense of rewinding the shade material 15 onto the wind-up shaft 19.

The pull-out profile 21 is guided at both ends in the two guide rails 16. The guide rails 16 are arranged behind the side lining 6 of the C-column 5, approximately following in their profiles the contours of the rear window 4, and accordingly move toward each other in the direction of their upper ends. In FIG. 2, they are shown straight for the sake of simplicity. The guide rails 16 begin below the rear seat shelf 17 and end in the vicinity of the top edge of the rear window 4.

Since the two guide rails 16 have the same construction, it is sufficient to explain in detail the shape of one of the guide rails 16. The guide rail 16 contains a guide groove 23, whose cross section is defined by a groove chamber 24 and a groove slot 25. The groove slot 25 features a smaller width than the groove chamber 24, which has a circular cross section. The groove slot 25 opens in the direction towards the rear window 5 and thus in the direction towards the viewer in the schematic representation.

The pull-out profile 21 is comprised of a middle piece 26 having a fixed length and two telescoping, movable end pieces 27, 28. The two end pieces 27, 28 are in turn mirror-inverted so again it is sufficient to describe only one of the two in detail. The description also applies to the other of the two end pieces 27, 28, wherein the same reference symbols are used to designate the similar structures.

The end piece 27 includes a flat-edged rod 29, which is guided so that it can move longitudinally but cannot rotate in an appropriate receptacle channel within the middle piece 26 and so that it projects from an adjacent end 30 of the middle piece 26. To symbolize the insertion of the rod 29 into the middle piece, the rod 29 is drawn with dashed lines on the right side, inside the middle piece 26.

The rod 29 is angled downwardly in the direction towards the slot 25 at its free end projecting out of the middle piece 26 relative to the plane of the drawing and leads through the slot 25 into the guide groove 23. Within the guide groove 23, a slide 31 is attached to the rod 29. The slide 31 has a shape that fits the cross section of the groove chamber 24. The thickness of the rod 29 is dimensioned so that it can move along the guide slot 25 without jamming.

As previously indicated, the shade material 15 has a trapezoidal outline and is defined by two side edges 32 and 33, which run approximately parallel to the two guide rails 16 when the shade material is extended. The bottom end of the shade material 15 is attached in a known way to the wind-up shaft 19, for example, by means of cabling, while the top edge is anchored to the middle piece 26 in a known manner.

For tensioning the shade material 15 in front of the rear window 4, in each groove chamber 24 of the guide rails there is a respective flexible linear pushing element 34 that is protectively retained against bending. The pushing element 34 is comprised of a core 35 having a circular cross section and a spiral 36 running on the outside of the core 35. The spiral 36 is rigidly connected to the core 35 to form teeth surrounding the outside of the core 35. In this respect, the linear pushing element 34 is similar to a flexible toothed rack with surrounding teeth. The pushing element 34 has a free end that abuts the adjacent end of the slide 31.

The two pushing elements 34 are moved by means of a common gear motor 37, which has guide tubes 38, 39 leading to the bottom end of each guide rail 16. The motor 37 comprises a gear housing 41 through which two bores 42 pass parallel to each other. Due to the broken-away representation in FIG. 2, only one of the two bores 42 can be seen. These bores 42 run tangentially past a gear 43 which is fixed on a gear output shaft of the gear motor 37. The gear 43 has teeth which match the pitch of the spiral 36 on the core 35. Hence, a positive connection is formed between the gear 43 and each of the two pushing elements 34.

Because the two pushing elements 34 mesh with the gear 43 on diametrically opposite sides, upon rotation of the gear 43, they are each moved by the same magnitudes in opposite directions. The part of the pushing element 34 projecting past the gear 43 is held in an appropriate storage tube.

The arrangement described thus far operates as follows:

In retraced condition of the roller blind 14, the pull-out profile or rod 21 lies on the pull-out slot 18 in the rear seat shelf 17 and covers this slot, at least over the length of the middle piece 26. In such retracted position, the pull-out profile 21 comes as close as possible to the wind-up shaft 19 and is thus also located in a region in which the two guide rails 16 are at a maximum distance from each other. Because the length of the middle piece 26 is constant, to compensate for the greater distance of the two guide rails 16, the end pieces 28, 29 are pulled out from the middle piece 26 to the maximum extent. They are still inserted in a movable way in the middle piece 26 with their ends. To achieve this position, through corresponding actuation of the gear motor 37, the two pushing elements 34 are pulled back far enough from the guide rails 16 so that the pull-out profile 21 can lie on the rear seat shelf 17.

When the shade material 15 is to be pulled out in front of the rear window 4 starting from the retracted position, the gear motor 37 is set in motion. The gear motor 37 advances the two pushing elements 34 in the guide rails 16 in opposite directions but by the same amounts. Against the action of the spring motor arrangement 22, which is constantly trying to rewind the shade material 15 onto the wind-up shaft 19, the pull-out profile 21 moves in the direction towards the top edge of the rear window 4, and thus in the direction towards the top end of the two guide rails 16. The force that the gear motor 37 can generate is greater than the restoring force that the spring motor arrangement 22 exerts.

For retracting the roller blind, the gear motor 37 is set in motion in the opposite rotational direction. It pulls the pushing element 34 back into the storage tube so that the spring motor arrangement 22 can rotate the wind-up shaft 19 in the sense of rewinding the shade material 15. To overcome friction, the pushing elements 34 can also be connected to the sliding pushing elements 31 in order to force the pull-out profile 21 to move in the direction towards the wind-up shaft 19. The spring motor arrangement 22 can then be designed to be less powerful to the extent that it merely need apply the force necessary to set the wind-up shaft 19 in motion or to hold the shade material 15 taut in the desired fashion when extended.

Figure 3:
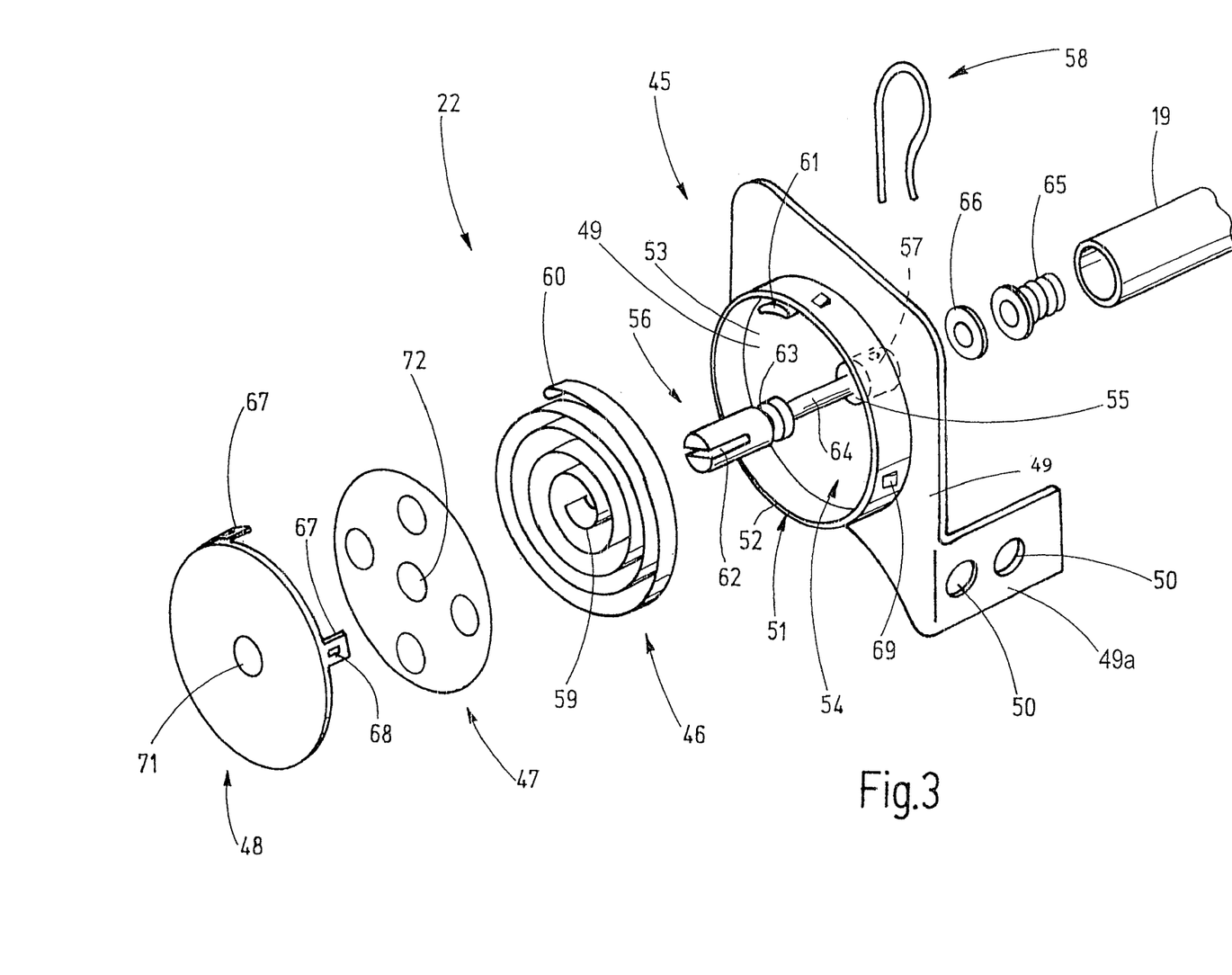
FIG. 3 is an enlarged exploded perspective of the flat spiral motor spring of the roller blind shown in FIG. 2.

The construction of the spring motor arrangement 22, as depicted in FIG. 3, includes a pot-shaped housing 45, a flat spiral spring 46, a damping plate 47, and a cover 48. The pot-shaped housing 45 is a plastic injection-molded part and is comprised of a base plate 49 to which an attachment angle 49a is connected, which is provided with attachment openings 50. With the aid of the attachment flange 49a, the housing 45 is fixedly anchored to the chassis of the vehicle. From the base plate 49, which is generally flat and which extends at a right angle to the longitudinal axis of the wind-up shaft 19, a cylindrical collar 51 is raised, which ends at an edge 52. The edge defines a plane that is parallel to the base plate 49. Within the collar 51, the base plate 49 forms a flat base 53 of the housing 45. The cylindrical collar 51 and the base 53 define a short, cylindrical inner space 54, i.e., a cylindrical inner space 54 of small axial depth.

Concentric to the collar 51 is a passage opening 55 in the base plate 49, through which a coupling shaft 56 is guided. On the rear side of the base plate 49, opposite the collar 51, is a short rearwardly extending tubular projection 57, which has a tangential opening for a spring clip 58 on the side. The spring clip 58, which is a wire bent into a U shape as shown, is used in the manner described further below to prevent the coupling shaft 56 from clattering in the bore 55.

The flat spiral spring 46 is composed of a spring steel strip and is wound, as shown, to form a multi-path spiral with the flat sides of the steel strip standing opposite each other. The flat spiral spring 46 has an inner end 59 and an outer end 60. The inner end 59 is shaped into a short bracket, which is bent at a right angle to the last spring winding and thus is somewhat parallel to the radius of the flat spiral spring 46 which can be thought of as a circular disk.

The outer end 60 of the illustrated spring 46 is turned down inwardly to foul' a loop. With the aid of the loop 60, the outer end is anchored on a pin 61 which projects into the vicinity of the inside of the collar 51 from the base plate 49.

The coupling shaft 56 is used to couple the inner spring end 59 to the wind-up shaft 19. For this purpose, the essentially cylindrical coupling shaft 56 has a slot 62 in its left end, as viewed in FIG. 3, in which the spring end 59 is inserted. At a distance from the slot 62, the coupling shaft 56 is formed with a surrounding annular groove 63, which, in the assembled state, is aligned with the tangential opening in the rearwardly extending projection 57 of the base plate and in which a leg of the U-shaped spring 58 lies. In order that it does not clatter, the coupling shaft is pressed against a side of the passage bore 55 with the aid of the spring 58. Adjacent the groove or channel 63, the coupling shaft 56 becomes narrower in a shaft section 64, which is locked in rotation in a coupling sleeve 65. The coupling sleeve 65 is locked in rotation in the assembled state in the tubular wind-up shaft 19. A felt disk 66 lying between the coupling sleeve 65 and the tubular projection 57 also is provided to prevent rattling in the axial direction.

The spring housing 45 is closed by a disk-shaped cover 48 carrying several brackets 67, which run parallel to the axis of the flat spiral spring 46 and which each are provided with a side opening 68. The brackets 67 overlap the collar 51 on the outside and are shaped so that they can be locked with tabs 69 on the outside of the collar. The tabs 69 project through the openings 68 in the assembled state.

In addition, the cover 48 has a bearing bore 71 for the adjacent end of the coupling shaft 56. The bore 71 holds the end of coupling shaft 56 which projects past the spring in the axial direction towards the cover 48. The cover 48 is flat on the side facing the flat spiral spring 46 and forms a contact surface for the damping plate 47.

Figure 4:
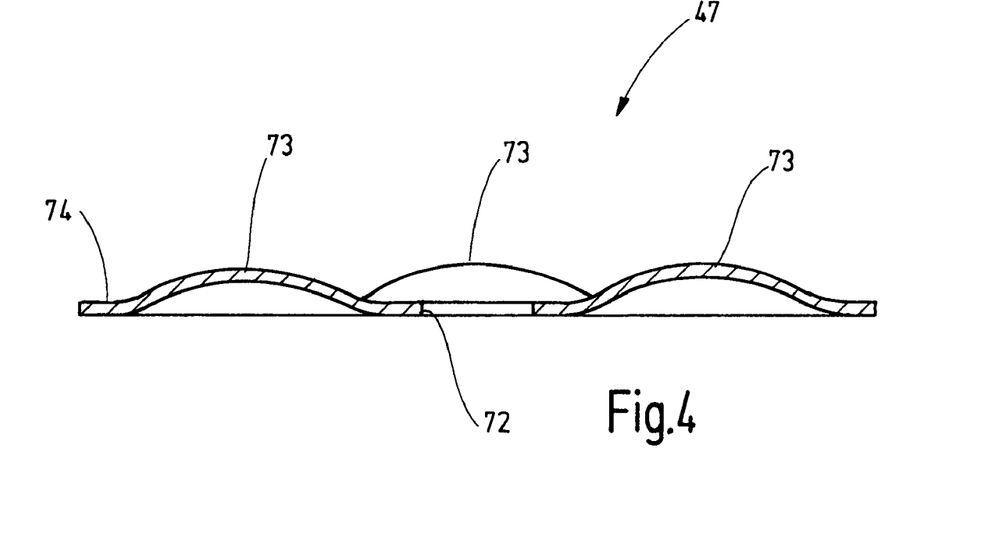
FIG. 4 is an enlarged vertical section of a damping plate of the spring motor shown in FIG. 3.

The damping plate 47 in the assembled condition lies between the cover 48 and the adjacent edge side of the flat spiral spring 46. The damping plate 47 is a circular plate with a central bore 72 for the passage of the coupling shaft 56. It has a diameter corresponding to the inner diameter of the housing 45. It is made of a plastic material, for example, PET, and has a thickness of about 0.2 mm. The cross-sectional shape of the damping plate 47 is shown in FIG. 4. The damping plate 47 has four uniform raised sections 73 distributed around the central opening 72. The raised sections 73 have the form of spherical caps. Their height relative to the adjacent flat top side 74 equals about 0.8 mm. The diameter of each spherical cap 73 is smaller than half the diameter at the base. As can be seen, the spherical caps 73 begin a distance from the outer circular edge of the damping plate 47 and end also a distance from the bore 72.

The damping plate 47 is set so that the raised sections 73 project towards the cover 48. Without biasing, the damping plate 47 would consequently contact the cover 48 at four points, namely the peaks of the raised sections 73.

The space between the base 53 of the pot-shaped inner space 54 of the housing and the adjacent inside of the placed cover 48 is slightly greater than the thickness of the flat spiral spring 46, measured in the axial direction. In this way, the damping plate 47 is confined in the space in the spring housing 45 when closed by the cover 48 with the damping plate 47 being deformed slightly elastically in the area of the raised sections 73.

The deformation of the damping plate 47 is elastic in the assembled state, i.e., also reversibly. In this way, a constant force is generated by which the damping plate 47 is pressed against the adjacent edge of the flat spiral spring 46 or the flat spiral spring 46 is pressed against the base of the spring housing 45.

Figure 5:
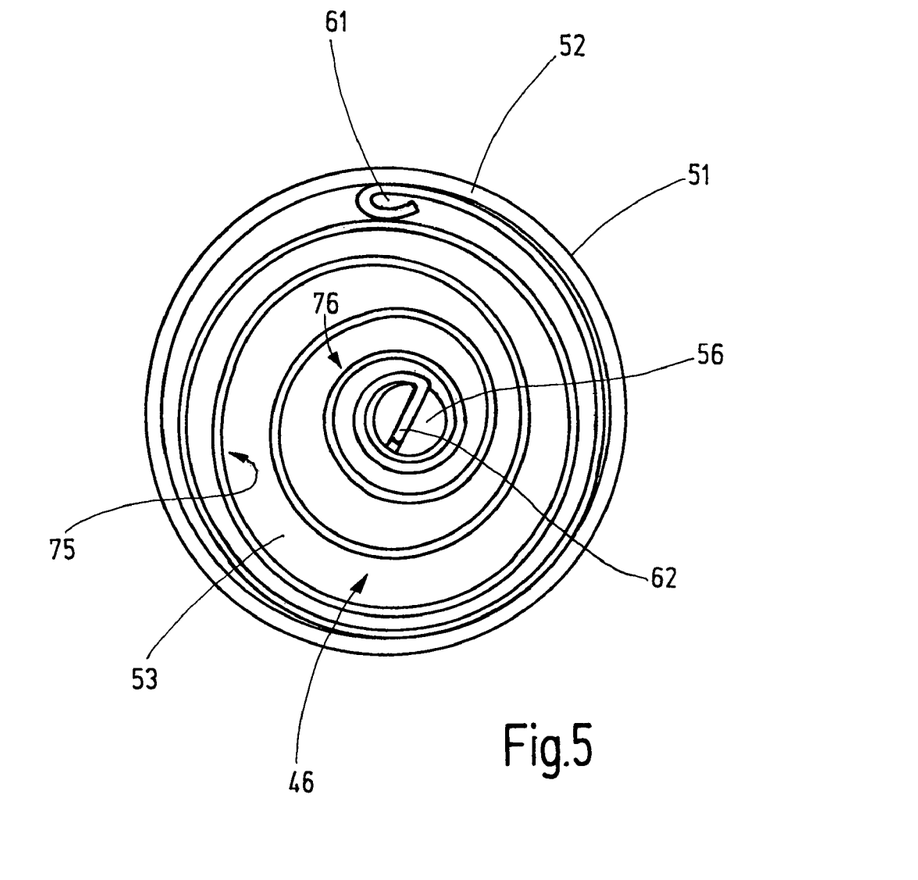
FIG. 5 is an alternative arrangement of the spring motor disposed parallel to the roller blind wind-up shaft.

The buzzing noise produced when the spring motor 22 is running can better be understood with reference to FIG. 5, which shows spring housing 45 in an opened condition with a side edge of the flat spiral spring 46, viewed from the direction of the cover 48, and the edge 52 of the pot-shaped housing 45 defined on the outside by the collar 51. The base 53 also can be seen between the spring windings, as well as the end of the coupling shaft 56 with the slot 62 contained therein.

In a partially pulled-out or extended roller blind state of the spring motor 22, a radially outer packet 75 of densely packed spring layers and also a radially inner packet 76 of similarly densely packed spring layers are produced. Both packets have an annular shape. During winding of the spring motor 22, the packet 76 increases radially in thickness, while the packet 75 decreases and transfers spring layers accordingly to the packet 76. The two packets 75, 76 are separated from each other by a space, in which, as shown, the spring windings have a relatively large distance from each other, while they are packed densely on each other with their flat sides in the packets 75, 76. The area with slack spring windings wanders in the radial direction through the inner space 54 of the pot-shaped housing 45 during winding or unwinding of the spring motor 22.

The unwinding of the spring windings, for example, from the inside of the packet 75, during winding of the spring motor 22, does not always happen completely uniformly, but instead the spring windings detach in jerks due to bonding effects, which leads to the result that radial vibrations are produced in the slack area of the spring windings between the two packets 75, 76. The radial vibrations can lead to the result that the spring windings can strike each other in the slack area between the two packets 75, 76 and can lead to a buzzing or rattling noise. For reasons of clarity, the area between the two packets 75, 76 is shown very open. Here, the spring windings actually lie also relatively densely packed for spatial reasons but without contact. The distance is so small that the vibrations can cause the striking of the spring layers.

Because the damping plate 47 contacts the edge of the flat spiral spring 46 with its flat side, the radial vibrations are damped. In FIG. 5, the edge forms the side of the flat spiral spring 46 facing the viewer. The raised sections 73, which are provided on the damping plate 47 and with which the damping plate 47 is supported on the inside of the cover 48, generate the necessary biasing force so that a frictional engagement is produced between the damping plate 47 and the edges of the spring windings, causes frictional damping of the vibrations. Through the biasing force of the damping plate 47, the edges of the spring windings facing away from the viewer (FIG. 5) are simultaneously pressed against the base 53, which can also contribute to a certain amount of damping.

The illustrated damping plate with the four spherical cap-shaped raised sections represents only one possible embodiment. Another variant, for example, consists of the use of a damping plate, which contains a channel or bead running concentrically around the bore 72 and which is also held in a pressed condition against the edge of the flat spiral spring 46 in the main middle area. Another possible alternative is a damping plate 47 that also serves as a cover in order to generate both the closing function for the housing 45 and the desired damping effect of the radial vibrations.

Figure 6:
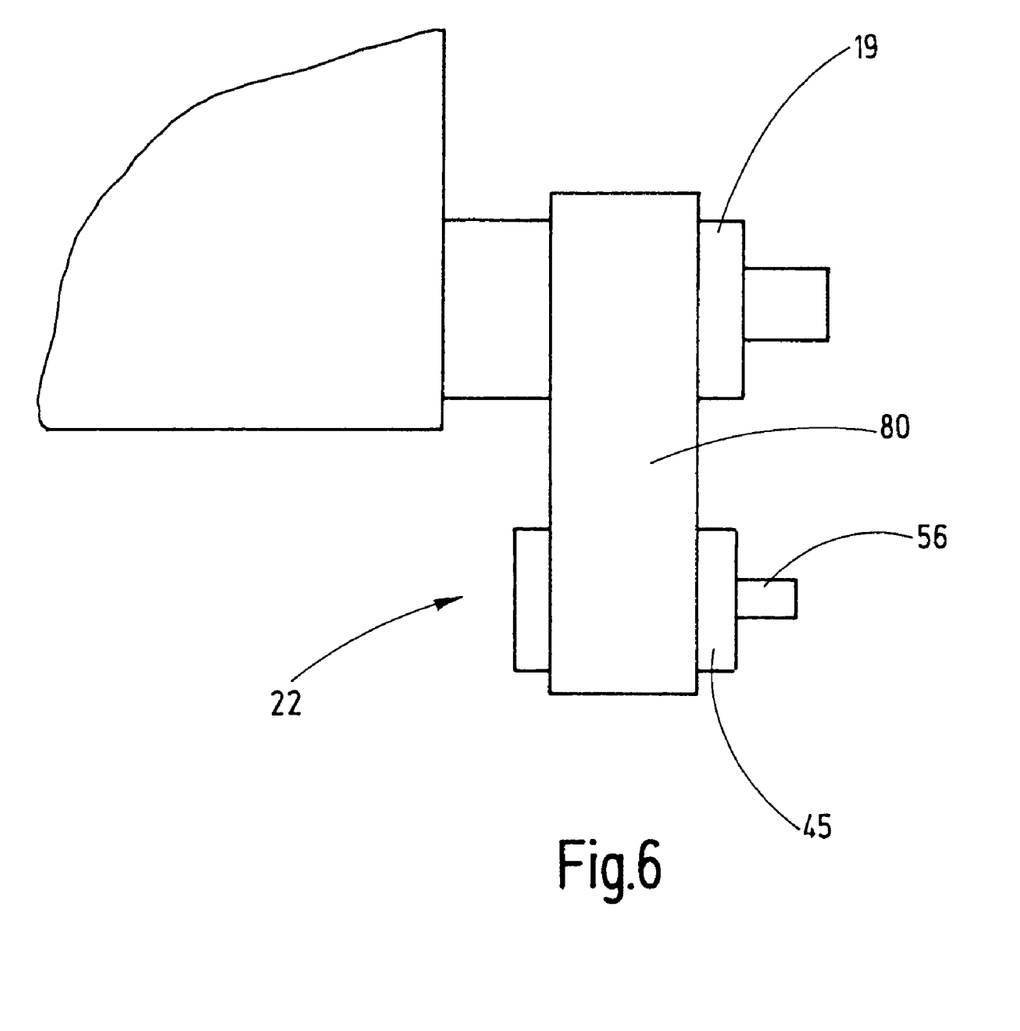
FIG. 6 is a top view of the spring motor housing.

It will be understood that the pot-shaped housing 45 does not have to be arranged coaxial to the wind-up shaft 19. It also is possible to provide the pot-shaped housing 45 in an axis-parallel relation next to the wind-up shaft 19, as depicted in FIG. 6. The axle journal 56 in this instance is used for the rotationally locked and stationary bearing for the housing 45, which is provided on the outside with appropriate ribs that are not shown in more detail. The ribs can be used as positively fitted teeth for an endless toothed belt 80, which engages in corresponding teeth on the outside of the wind-up shaft 19. The construction of the spring motor 22 may be the same way as described above.

Figure 7:
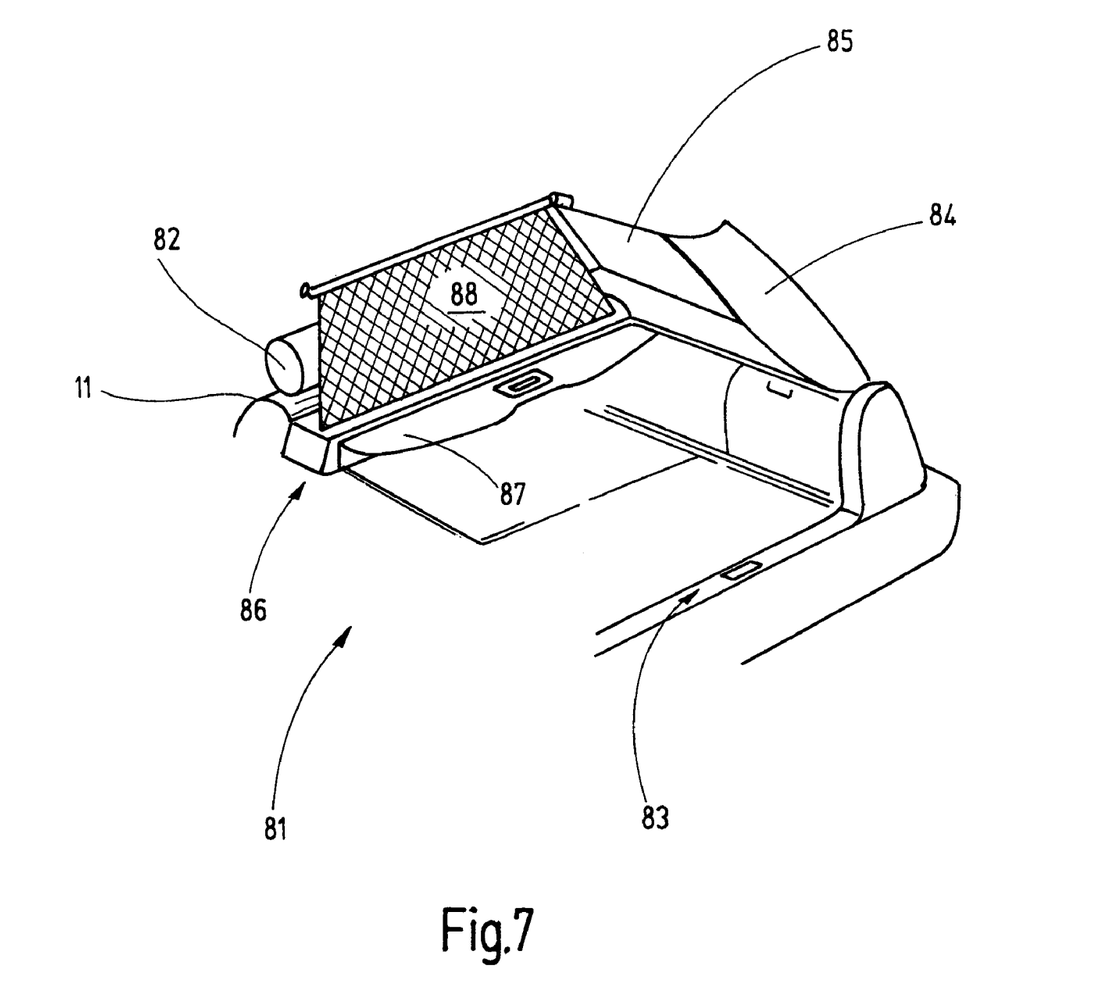
FIG. 7 is a broken away perspective of the rear area of a passenger vehicle with additional roller blind devices for use with a flat spiral spring motor according to the invention.

The use of the spring motor 22 according to the invention also is not limited to the rear-window roller blinds. FIG. 7 depicts a view of a broken-away trunk space 81, with the rear side of the rear seat back 11 with head supports 82 showing. In addition, the storage space 83 can be seen, which is limited towards the back right by a chassis column 84. A side window 85 extends forwardly next to the chassis column 84.

An elongated cassette-shaped housing 86, in which a wind-up shaft is rotatably mounted, is attached to the rear side of the rear seat back 11. A cover shade material 87, which is designed to close and block the view of the storage space 83 from above, is windable onto this wind-up shaft. Furthermore, the elongated cassette-shaped housing 86 contains a separating screen 88, which is wound onto a wind-up shaft that is driven with a spring motor 22, as previously described.

From the foregoing, it can be seen that a roller blind assembly is provided that has a spring motor with a pot-shaped housing in which a flat spiral spring is housed. The flat spiral spring is connected at an outer end to the pot-shaped housing, while the inner end being coupled to a shaft or axle. To prevent radial vibrations of the individual spring layers when the spring motor is wound or unwound, a damping plate is housed in the pot-shaped housing which is held pressed to a side edge of the flat spiral spring. The spring motor can be combined, in particular, with the wind-up shaft of roller-blind arrangements for motor vehicles. Such roller-blind arrangements can be fixed roller blinds, storage area covers, or separating screens.

The invention claimed is:

1. A roller blind assembly (14) for motor vehicles comprising:
   a windable sheet material (15),
   a rotatable shaft (19) mountable in a motor vehicle to which one edge of the sheet material (15) is attached,
   a flat spiral spring (46) coupled to said wind-up shaft (19) for biasing the wind-up shaft (19) in a direction for winding the sheet material onto the wind-up shaft, said flat spiral spring having opposite side edges and forming a plurality of spring wound layers,
   a spring housing (45) in which said flat spiral spring (46) is housed, and
   at least one damping plate (47) held in contacting relation with one side edge of said flat spiral spring (46) for damping vibrations of the spring layers during operation of the roller blind assembly, said damping plate (47) including a flat plate portion and a plurality of deformable raised sections (73) extending transversely to said flat plate portion for biasing said damping plate into contacting relation with said one edge of said flat spiral spring (46).

2. The roller blind assembly of claim 1 in which said rotatable shaft is mountable adjacent a motor vehicle window, and said sheet material is extendable from said shaft for shading said window.

3. The roller blind assembly of claim 1 in which said roller blind shaft is mountable in a motor vehicle storage area, and said sheet material is extendable from said shaft for covering the storage area.

4. The roller blind assembly of claim 1 in which said flat spiral spring is disposed outside said rotatable shaft (19).

5. The roller blind assembly of claim 1 in which said flat spiral spring is arranged coaxial to said rotatable shaft (19).

6. The roller blind assembly of claim 1 in which said flat spiral spring is mounted adjacent an end of said rotatable shaft (19).

7. The roller blind assembly of claim 1 in which said housing is pot shaped and is stationarily mountable in said motor vehicle.

8. The roller blind assembly of claim 1 including a cover (48) closing said housing (45), said cover having an axial bore (71) for receiving an end of said rotatable shaft.

9. The roller blind assembly of claim 1 in which said flat spiral spring is a metal band flat spiral spring.

10. The roller blind assembly of claim 1 in which said flat spiral spring (46) has an outer end (60) bent into a loop.

11. The roller blind assembly of claim 1 in which said flat spiral spring (46) has an inner end (59) bent at a right angle relative to a last spring winding to form a straight radial section.

12. The roller blind assembly of claim 1 in which said damping plate (47) is made of a plastic.

13. The roller blind assembly of claim 12 in which the plastic material of the damping plate (47) is selected from a plastic group consisting of PET, polycarbonate and ABS.

14. The roller blind assembly of claim 1 in which said damping plate (47) has a thickness between 0.5 mm and 0.02 mm.

15. The roller blind assembly of claim 14 in which said damping plate (47) has a thickness of about 0.2 mm.

16. The roller blind assembly of claim 1 in which said damping plate (47) is circular in shape.

17. The roller blind assembly of claim 1 in which said damping plate (47) has a diameter corresponding to an internal opening of said housing (45).

18. The roller blind assembly of claim 1 in which said damping plate raised sections have diameters less than half the diameter of the damping plate (47).

19. The roller blind assembly of claim 1 in which each said raised section (73) is in the form of a spherical cap.

20. The roller blind assembly of claim 1 in which said raised sections are circular in shape.

21. The roller blind assembly of claim 1 in which said raised sections are circumferentially spaced about said damping plate.

22. The roller blind assembly of claim 1 in which said raised sections have a height of between 0.1 mm and 1 mm.

23. The roller blind assembly of claim 1 in which said raised sections have a height of about 0.8 mm.

24. The roller blind assembly of claim 1 in which said damping plate (47) forms a cover of the spring housing (45).

25. A spring motor (22) comprising: a pot shaped spring housing (45),
   a flat spiral spring (46) housed in said pot shaped spring housing (45), said spiral spring having a plurality of windings that form spring layers, said flat spiral spring having a radially inner end (59) coupled to a shaft (56) for biasing the shaft in a rotary direction of shaft movement, and
   at least one damping plate (46) secured in contact to one side of said flat spiral spring (47) for damping vibrations of said spring layers during operation of said spring motor and rotation of said shaft, said damping plate (47) including a flat plate portion and a plurality of deformable raised sections (73) extending transversely to said flat plate portion for biasing said damping plate into contacting relation with said one edge of said flat spiral spring (46).

26. The spring motor of claim 25 in which said pot shaped housing is mounted stationary.

27. The spring motor of claim 25 including a cover (48) for closing said spring housing, said cover being formed with an axial bore for receiving an end of said shaft.

28. The spring motor of claim 25 in which said flat spiral spring (46) is a metal band flat spiral spring.

29. The spring motor of claim 25 in which said damping plate (47) is made of a plastic material.

30. The spring motor of claim 29 in which said plastic material of the damping plate is selected from a plastics group consisting of PET, polycarbonate, and ABS.

31. The spring motor of claim 25 in which said damping plate (47) has a thickness between 0.5 mm and 0.02 mm.

32. The spring motor of claim 25 in which said damping plate (47) is circular in shape.

33. The spring motor of claim 25 in which said damping plate (47) has a diameter corresponding to an internal opening of said spring housing (45).

34. The spring motor of claim 25 in which said raised sections (73) have diameters less than half the diameter of the damping plate.

35. The spring motor of claim 25 in which each said raised section (73) has the form of a spherical cap.

36. The spring motor of claim 25 in which said raised sections are circular in shape.

37. The spring motor of claim 25 in which said raised sections extend circumferentially about said damping plate.

38. The spring motor of claim 25 in which each said raised section has a height of between 0.1 mm and 1 mm.

39. The spring motor of claim 28 in which said damping plate (47) forms a cover of said spring housing (45).

40. The roller blind assembly of claim 1 including a cover (48) enclosing said housing (45), and said damping plate being interposed between said cover and said one edge of said flat spiral spring (46).

41. The roller blind assembly of claim 40 in which said raised sections are in biasing engagement with said cover.

42. The roller blind assembly of claim 25 including a cover (48) enclosing said housing (45), and said damping plate being interposed between said cover and said one edge of said flat spiral spring (46).

43. The roller blind assembly of claim 42 in which said raised sections are in biasing engagement with said cover.

* * * * *